United States Patent
Sironi et al.

(10) Patent No.: US 11,402,888 B1
(45) Date of Patent: Aug. 2, 2022

(54) USB TYPE-A POWER EXTENSION TO SUPPORT HIGH POWER MODULES

(71) Applicant: Cisco Technology, Inc., San Jose, CA (US)

(72) Inventors: Paolo Sironi, Gallarate (IT); Roberto Gianella, Settimo Milanese (IT)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/301,468

(22) Filed: Apr. 5, 2021

Related U.S. Application Data

(60) Provisional application No. 63/199,953, filed on Feb. 4, 2021.

(51) Int. Cl.
| | |
|---|---|
| *G06F 1/26* | (2006.01) |
| *G06F 13/38* | (2006.01) |
| *G06F 13/40* | (2006.01) |
| *G06F 11/30* | (2006.01) |
| *G06F 13/42* | (2006.01) |
| *G06F 21/44* | (2013.01) |

(52) U.S. Cl.
CPC .............. *G06F 1/266* (2013.01); *G06F 1/263* (2013.01); *G06F 11/3051* (2013.01); *G06F 13/382* (2013.01); *G06F 13/4068* (2013.01); *G06F 13/4282* (2013.01); *G06F 21/44* (2013.01); *G06F 13/42* (2013.01); *G06F 2213/0042* (2013.01)

(58) Field of Classification Search
CPC .......... G06F 1/266; G06F 1/28; G06F 1/3215; G06F 1/3296; G06F 13/382; G06F 13/4068; G06F 13/4081; G06F 13/42; G06F 13/4282; G06F 21/44; G06F 21/81; G06F 2213/0042; G06F 1/263; G06F 11/3051

See application file for complete search history.

(56) References Cited

U.S. PATENT DOCUMENTS

| | | | | |
|---|---|---|---|---|
| 6,283,789 B1* | 9/2001 | Tsai | ................... | H01R 27/02 439/502 |
| 8,661,268 B2* | 2/2014 | Brooks | ................... | G06F 1/266 713/300 |
| 2005/0278554 A1* | 12/2005 | Frank | ................... | G06F 1/266 713/300 |
| 2008/0248672 A1* | 10/2008 | Yip | ................... | H01R 27/02 439/300 |
| 2012/0297207 A1* | 11/2012 | Carlsen | ............... | G06F 13/4081 713/300 |
| 2014/0244869 A1* | 8/2014 | Adrian | ................... | G06F 13/387 710/106 |
| 2015/0028824 A1* | 1/2015 | Tse | ................... | H02M 1/10 323/234 |
| 2015/0301552 A1* | 10/2015 | Lim | ................... | G01K 7/16 327/538 |
| 2015/0362984 A1* | 12/2015 | Waters | ................... | G06F 1/3206 713/324 |

(Continued)

*Primary Examiner* — Thomas J. Cleary
(74) *Attorney, Agent, or Firm* — Patterson + Sheridan, LLP

(57) ABSTRACT

A method includes detecting, by a hardware processor and over a universal serial bus (USB) Type-A connection, whether a client controller is present in a client device. The method also includes supplying power to the client device over the USB Type-A connection by selecting between one of a first power source or a second power source depending on whether the client controller is detected.

16 Claims, 5 Drawing Sheets

(56) References Cited

U.S. PATENT DOCUMENTS

| | | | |
|---|---|---|---|
| 2016/0226308 A1* | 8/2016 | Valin | H01M 16/00 |
| 2016/0370835 A1 | 12/2016 | Erickson et al. | |
| 2016/0378704 A1 | 12/2016 | Adamson et al. | |
| 2017/0293338 A1 | 10/2017 | Lester | |
| 2017/0347454 A1* | 11/2017 | Harashima | H01R 24/64 |
| 2018/0143916 A1 | 5/2018 | Gupta et al. | |
| 2019/0157816 A1* | 5/2019 | Duan | H01R 24/64 |
| 2019/0188180 A1 | 6/2019 | Schnell et al. | |
| 2020/0287403 A1* | 9/2020 | Liu | H02J 7/04 |
| 2020/0311009 A1* | 10/2020 | Tu | G06F 13/4282 |

* cited by examiner

USB TYPE-A POWER EXTENSION TO SUPPORT HIGH POWER MODULES

CROSS-REFERENCE TO RELATED APPLICATIONS

This application claims benefit of U.S. provisional patent application Ser. No. 63/199,953, filed Feb. 4, 2021. The aforementioned related patent application is herein incorporated by reference in its entirety.

TECHNICAL FIELD

Embodiments presented in this disclosure generally relate to power control. More specifically, embodiments disclosed herein relate to power control over a universal serial bus (USB) Type-A interface.

BACKGROUND

Certain circuits (e.g., optical circuits) use a USB Type-A interface to power and communicate with an external component (e.g., a filter). As these external components have advanced, so have their power requirements.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
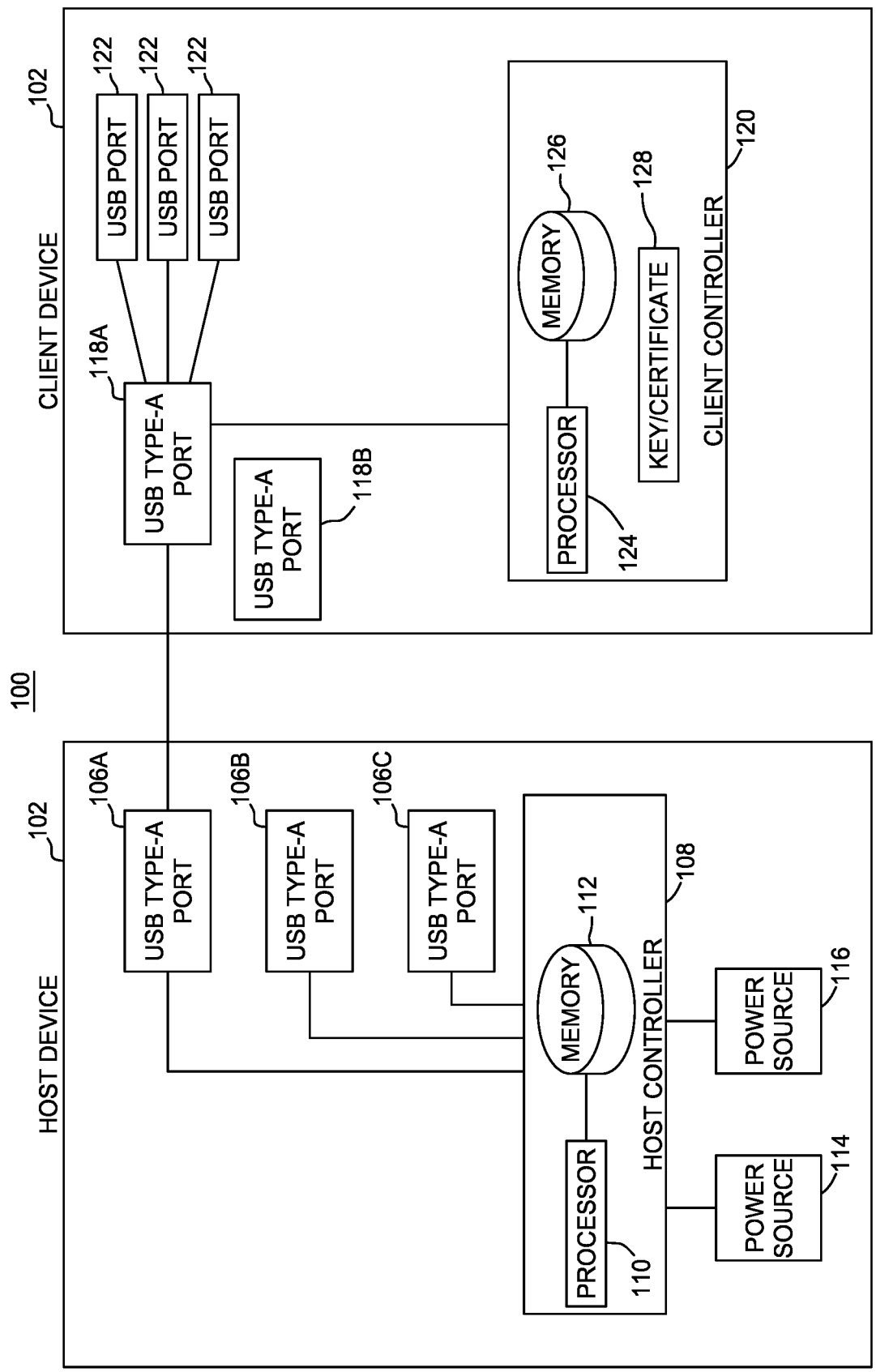
FIG. 1 illustrates an example system.

According to an embodiment, a method includes detecting, by a hardware processor and over a universal serial bus (USB) Type-A connection, whether a client controller is present in a client device. The method also includes supplying power to the client device over the USB Type-A connection by selecting between one of a first power source or a second power source depending on whether the client controller is detected. Other embodiments include an apparatus for performing this method.

According to another embodiment, a method includes receiving, by a hardware processor and over a USB Type-A connection, a data signal from a host controller and communicating, by the hardware processor and over the USB Type-A connection a security key or a security certificate to the host controller in response to the data signal. The method also includes receiving power over the USB Type-A connection from the host controller. The power is supplied using one of a first power source or a second power source depending on whether the security key or the security certificate is valid.

Example Embodiments

Certain circuits (e.g., optical circuits) use a USB Type-A interface to power and communicate with an external component (e.g., a filter). The 5V source of a USB Type-A interface was sufficient to power many of these external components over the USB Type-A interface. As these external components have advanced, however, so have their power requirements. There now exists components for which the 5V source of the USB Type-A interface provides insufficient power. As a result, these components do not function when plugged into a conventional USB Type-A interface.

This disclosure describes a USB Type-A interface that can supply power from two different power sources (e.g., a 5V source and a 12V source) depending on the type of component connected at the interface. The interface may include a host controller (e.g., a host inter-integrated circuit (I2C) controller). In one embodiment, two wires in the interface (e.g., a USB Receive wire and a USB Transmit wire of a USB 3.0 interface on a Type-A connector) are used to communicate clock and data signals to and from the host controller. The host controller determines which power source to use by detecting the presence of a client controller (e.g., client I2C controller) in the connected component. For example, if the host controller detects the client controller, the host controller may use a 12V source to supply power over a power wire of the interface. Otherwise, the host controller may use a 5V source to supply power over the power wire of the interface. Two wires (e.g., a USB receive wire and a USB transmit wire) are used to communicate clock and data signals to and from the client controller. The host controller may detect the presence of the client controller through identification messages communicated by the client controller to the host controller. In this manner, the USB Type-A interface may supply additional power (e.g., 20 W to 25 W of power) when needed.

FIG. 1 illustrates an example system 100. As seen in FIG. 1, the system 100 includes a host device 102 and a client device 104. Generally, the host device 102 provides electric power to the client device 104 over a USB Type-A connection. The host device 102 varies the amount of electric power provided to the client device 104, depending on whether the host device 102 detects the presence of a particular client controller in the client device 104. In this manner, the host device 102 provides sufficient electric power to the client device 104, in particular embodiments.

The host device 102 includes one or more USB Type-A ports 106 and a host controller 108. The host controller 108 supplies electric power through the one or more USB type A ports 106. In particular embodiments, the host controller 108 can change or adjust the amount of electric power supplied through the USB Type-A ports 106 depending on whether the host controller 108 detects the presence of a particular client controller in a connected client device 104.

The host device 102 includes one or more USB Type-A ports 106. In the example of FIG. 1, the host device 102 includes USB Type-A ports 106A, 106B, and 106B. Each USB Type-A port 106 forms an interface through which a USB connection may be made over a USB Type-A connector or cable. The connector or cable may engage the USB Type-A port 106 such that the USB Type-A port 106 may communicate electric signals over the connector or cable. For example, clock signals, data signals, and electric power signals may be communicated through the USB Type-A port 106 and over the connector or cable.

The host controller 108 communicates signals through the USB Type-A ports 106. In particular embodiments, the host controller 108 adjusts electric power signals communicated over the USB Type-A ports 106 based on whether the host controller 108 detects a particular client controller in a connected client device 104. As seen in FIG. 1, the host controller 108 includes a processor 110 and a memory 112, which are configured to perform any of the functions or actions of the host controller 108 described herein.

The processor 110 is any electronic circuitry, including, but not limited to microprocessors, application specific integrated circuits (ASIC), application specific instruction set processor (ASIP), and/or state machines, that communicatively couples to memory 112 and controls the operation of the host controller 108. The processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 110 may include other hardware that operates software to control and process information. The processor 110 executes software stored on memory to perform any of the functions described herein. The processor 110 controls the operation and administration of the host controller 108 by processing information (e.g., information received from the client device 104 or the memory 112). The processor 110 may be a programmable logic device, a microcontroller, a microprocessor, any suitable processing device, or any suitable combination of the preceding. The processor 110 is not limited to a single processing device and may encompass multiple processing devices.

The memory 112 may store, either permanently or temporarily, data, operational software, or other information for the processor 110. The memory 112 may include any one or a combination of volatile or non-volatile local or remote devices suitable for storing information. For example, the memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 112, a disk, a CD, or a flash drive. In particular embodiments, the software may include an application executable by the processor 110 to perform one or more of the functions described herein.

The host controller 108 supplies electric power through a USB Type-A port 106 using one or more power source. In the example of FIG. 1, the host controller 108 supplies electric power using power sources 114 or 116 (e.g., power rails). The host controller 108 selects one of the power sources 114 or 116 to supply electric power. The power sources 114 and 116 provide different amounts of electric power. For example, the power source 114 may be a 5-volt source and the power source 116 may be a 12-volt source. The host controller 108 selects one of the power sources 114 or 116 to supply electric power to a connected client device 104 depending on whether the host controller 108 detects the presence of a particular client controller in the client device 104. For example, if the host controller 108 detects the presence of the particular client controller, the host controller 108 may supply electric power using the 12-volt power source 116. If the host controller 108 does not detect the presence of the client controller, then the host controller 108 may supply electric power using the 5-volt power source 114. The host controller 108 supplies the electric power through a USB Type-A port 106.

The client device 104 connects to the host device 102 to receive electric power from the host device 102. As seen in FIG. 1, the client device 104 includes one or more USB Type-A ports 118, a client controller 120, and one or more USB ports 122. Generally, the client device 104 connects to the host device 102 through the USB Type-A ports 118. The client device 104 powers the USB ports 122 using the electrical power supplied by the host device 102.

The USB Type-A ports 118 form an interface through which a USB Type-A connection may be made with the host device 102. For example, a USB Type-A connector or cable can engage the USB Type-A ports 118 to form a USB Type-A connection with a USB Type-A port 106 in the host device 102. Electric signals, including electric power and data signals, may then be communicated over the USB connector or cable through the USB Type-A port 118. As seen in FIG. 1, the client device 104 includes a USB Type-A port 118A and a USB Type-A port 118B. In particular embodiments, the client device 104 connects to the host device 102 using multiple USB Type-A ports 118. For example, the client device 104 may connect to the host device 102 by forming a USB Type-A connection between USB type A port 118A and USB type A port 106A and by forming USB Type-A connection between USB Type-A port 118B and USB Type-A port 106B. The connection between the USB Type-A port 118A and the USB Type-A port 106A may supply electric power and electric signals (e.g., data signals) between the host device 102 and the client device 104. The connection between USB Type-A port 106B and USB Type-A port 118B may supply supplemental electric power from the host device 102 to the client device 104.

The client device 104 may use the electric power supplied by the host device 102 to power the one or more USB ports 122 or one or more devices connected to the USB ports 122. The supplemental power supplied through the USB Type-A port 118B may be supplied to the USB ports 122.

The client controller 120 may communicate signals to the host device 102 that notify the host device 102 of the presence of the client controller 120. As seen in FIG. 1, the client controller 120 includes a processor 124 and a memory 126, which are configured to perform any of the functions or actions of the client controller 120 described herein.

The processor 124 is any electronic circuitry, including, but not limited to microprocessors, application specific integrated circuits (ASIC), application specific instruction set processor (ASIP), and/or state machines, that communicatively couples to memory 126 and controls the operation of the client controller 120. The processor 124 may be 8-bit, 16-bit, 32-bit, 64-bit or of any other suitable architecture. The processor 124 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 124 may include other hardware that operates software to control and process information. The processor 124 executes software stored on memory to perform any of the functions described herein. The processor 124 controls the operation and administration of the client controller 120 by processing information (e.g., information received from the host device 102 and the memory 126). The processor 124 may be a programmable logic device, a microcontroller, a microprocessor, any suitable processing device, or any suitable combination of the preceding. The processor 124 is not limited to a single processing device and may encompass multiple processing devices.

The memory 126 may store, either permanently or temporarily, data, operational software, or other information for the processor 124. The memory 126 may include any one or a combination of volatile or non-volatile local or remote devices suitable for storing information. For example, the memory 126 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 126, a disk, a CD, or a flash drive. In particular embodiments, the software may include an application executable by the processor 124 to perform one or more of the functions described herein.

The client controller 120 communicates data signals over the USB Type-A port 118A to the host device 102 to indicate to the host device 102 of the presence of the client controller 120. In particular embodiments, the host device 102 determines from these data signals whether the client controller 120 is a particular client controller 120. The host device 102 then determines which power source 114 or 116 to use to provide electric power to the client device 104. For example, the client device 104 may communicate a security key or certificate 128 to the host device 102 through the USB Type-A port 118A. The host device 102 may validate the security key or certificate 128. If the security key or certificate 128 is valid, the host device 102 supplies electric power to the client device 104 using a 12-volt power source 116. If the security key or certificate 128 is not valid, the host device 102 supplies electric power to the client device 104 using a 5-volt power source 114. In some embodiments, the client controller 120 communicates an identifier of the client controller 120 to the host device 102 rather than the security key or certificate 128. The host device 102 analyzes the identifier to determine whether the client device 104 needs a lower electric power, such as 5 volts or a higher electric power such as 12 volts. The host device 102 then provides electric power to the client device 104 using the appropriate power source 114 or 116.

Figure 2:
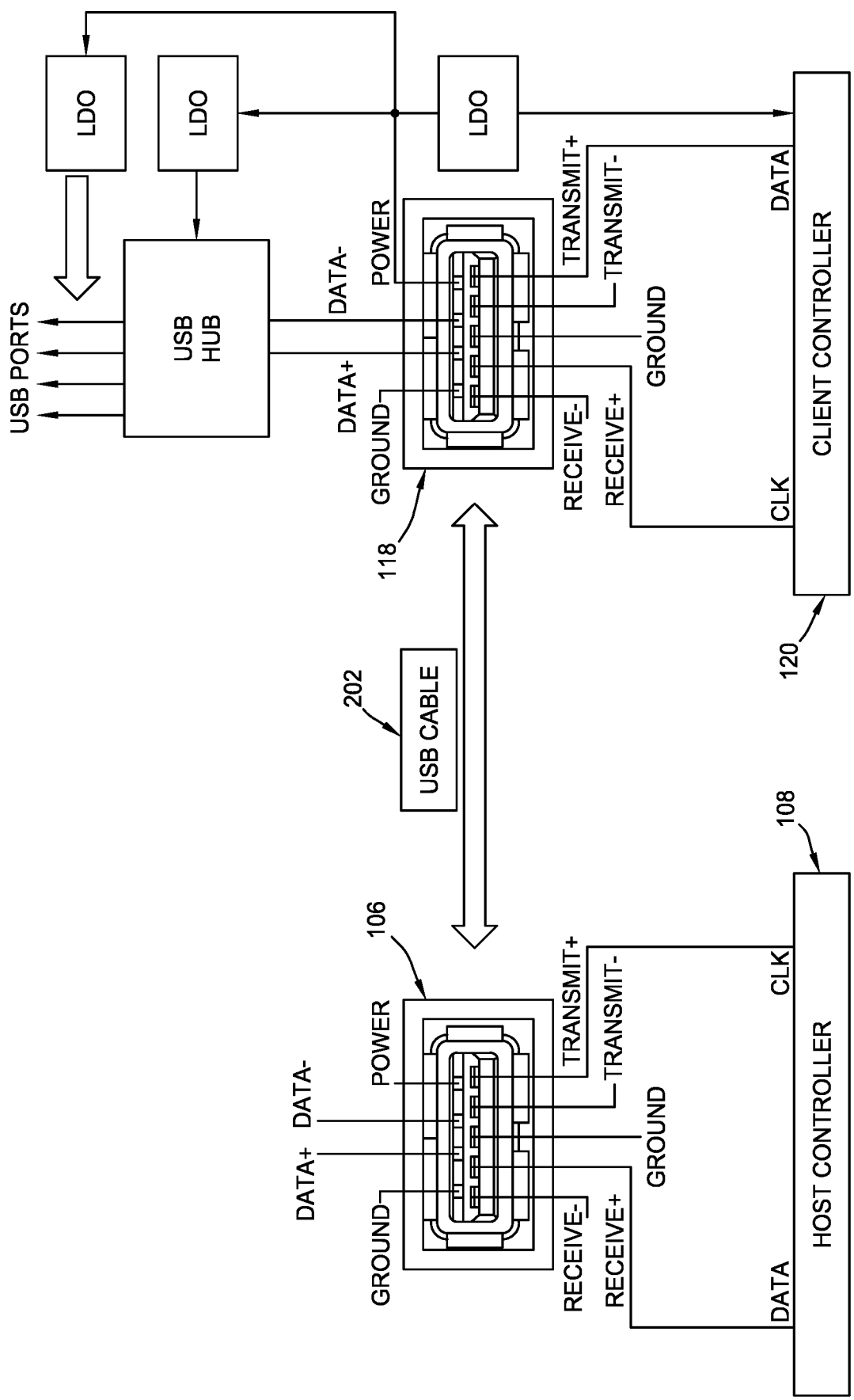
FIG. 2 illustrates example components of the system of FIG. 1.

FIG. 2 illustrates example components of the system 100 of FIG. 1. Specifically, FIG. 2 shows the interface between the host controller 108 and the USB Type-A port 106 and the interface between the client controller 120 and the USB Type-A port 118. In particular embodiments, the host controller 108 connects to two wires in the USB Type-A port 106, and the client controller 120 connects to two wires in the USB Type-A port 118. The host controller 108 communicates with the client controller 120 using the two wires in the USB Type-A port 106 and the two wires in the USB Type-A port 118.

As seen in FIG. 2, the USB Type-A port 106 includes two ground wires, two data wires (Data− and Data+), a power wire, two Receive wires (Receive− and Receive+), and two Transmit wires (Transmit− and Transmit+). The host controller 108 connects to the USB type A port 106 using two of the wires (e.g., a Receive wire and a Transmit wire). In the example of FIG. 2, the host controller 108 connects to the USB Type-A port 106 using the Receive+ wire and the Transmit+ wire. The host controller 108 may instead connect to the USB Type-A port 106 using the Receive− wire or the Transmit− wire. The host controller 108 communicates or receives a clock signal over the connected Transmit wire (e.g., the Transmit+ wire or the Transmit− wire). The host controller 108 communicates or receives a data signal over the connected Receive wire (e.g., the Receive+ wire or the Receive− wire). Alternatively, the host controller 108 may communicate or receive the data signal over a connected Transmit wire (e.g., the Transmit+ wire or the Transmit− wire) and the clock signal over a connected Receive wire (e.g., the Receive+ wire or the Receive− wire).

A USB cable 202 engages the USB Type-A port 106 and the USB Type-A port 118 to form a USB Type-A connection between the USB Type-A port 106 and the USB Type-A port 118. The USB cable 202 may be a USB Type-A cable that has USB Type-A connectors on both ends of the USB cable 202. The host controller 108 may communicate with the client controller 120 over the USB cable 202.

The client controller 120 connects to the USB Type-A port 118 using two wires of the USB Type-A port 118. For example, the client controller 120 may connect through a Receive wire and a Transmit wire of the USB Type-A port 118. In the example of FIG. 2, the client controller 120 connects to the USB Type-A port 118 through the Receive+ wire and the Transmit+ wire. The client controller 120 may instead connect to the USB Type-A port 118 using the Receive− wire or the Transmit− wire. The client controller 120 communicates or receives a clock signal over the connected Receive wire (e.g., the Receive+ wire or the Receive− wire). The client controller 120 communicates or receives a data signal over the connected Transmit wire (e.g., the Transmit+ wire or the Transmit− wire). Alternatively, the client controller 120 may communicate or receive the clock signal over a connected Transmit wire and the data signal over a connected Receive wire.

The host controller 108 and the client controller 120 use the clock signal to synchronize communications with one another. The host controller 108 and the client controller 120 may communicate data signals according to the clock signal. For example, the client controller 120 may communicate a security key or certificate 128 or an identifier to the host controller 108 over a Transmit wire of the USB Type-A port 118. The host controller 108 may receive the security key or certificate 128 or the identifier over a Transmit wire of USB Type-A port 106. The host controller 108 then determines, based on the security key or certificate 128 or the identifier, how much electric power to supply to the client device 104.

The host device 102 supplies electric power to the client device 104 through a power wire of the USB Type-A port 106. The client device 104 receives the electric power over a power wire of the USB Type-A port 118. The host controller 108 controls the amount of electric power supplied to the power wire of the USB Type-A port 106 and received over the power wire of the USB Type-A port 118. For example, if the host controller 108 detects the presence of the client controller 120 the host controller 108 may supply power over the power wire of the USB Type-A port 106 using a 12-volt power source. If the host controller 108 does not detect the presence of the client controller 120, the host controller 108 may supply electric power over the power wire of the USB Type-A port 106 using a 5-volt power source. The USB Type-A port 118 may receive the electric power and distribute that electric power to the components of the client device 104. In the example of FIG. 2, the electric power is supplied to the client controller 120 and the USB ports 122.

Figure 3:
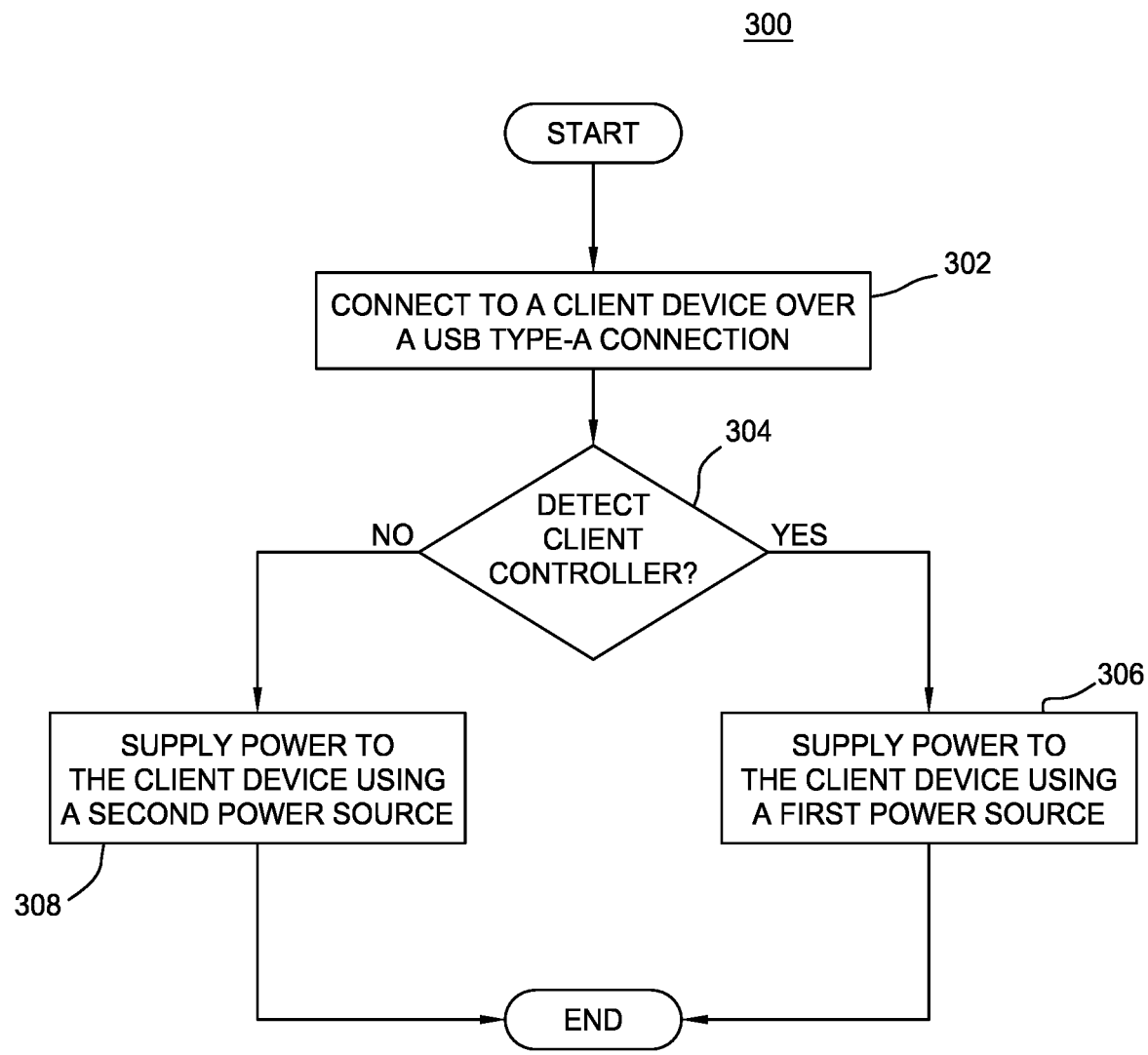
FIG. 3 is a flowchart of an example method in the system of FIG. 1.

FIG. 3 is a flowchart of an example method 300 in the system 100 of FIG. 1. The host controller 108 performs the method 300. In particular embodiments, by performing the method 300, the host controller 108 supplies sufficient electric power to a client device 104.

In block 302, the host controller 108 connects to a client device 104 over a USB Type-A connection. The host device 102 includes a USB Type-A port 106 and the client device 104 includes a USB Type-A port 118. The USB Type-A connection may be formed by engaging a USB cable 202 to the USB Type-A port 106 and the USB Type-A port 118.

In block 304, the host device 102 detects whether the client device 104 includes a particular client controller 120. For example, the host controller 108 may analyze an identifier communicated by the client device 104 over the USB Type-A connection. Based on the analysis of the identifier, the host device 102 determines whether the client device 104 includes the client controller 120. If the identifier does not properly identify the controller 120, if the identifier identifies a different controller, or if the identifier is not communicated, then the host controller 108 determines that the client controller 120 is absent from the client device 104.

If the host controller 108 determines that the client device 104 includes the client controller 120, the host device 102 determines that the client device 104 needs additional electric power. In response, the host controller 108 supplies power to the client device 104 using a first power source 116 (e.g., a 12-volt power source) in block 306. If the host controller 108 determines that the client device 104 does not include the client controller 120, the host controller 108 supplies power to the client device 104 using a second power source 114 (e.g., a 5-volt power source) in block 308. In this manner, the host controller 108 supplies sufficient electric power to the client device 104 in particular embodiments.

Figure 4:
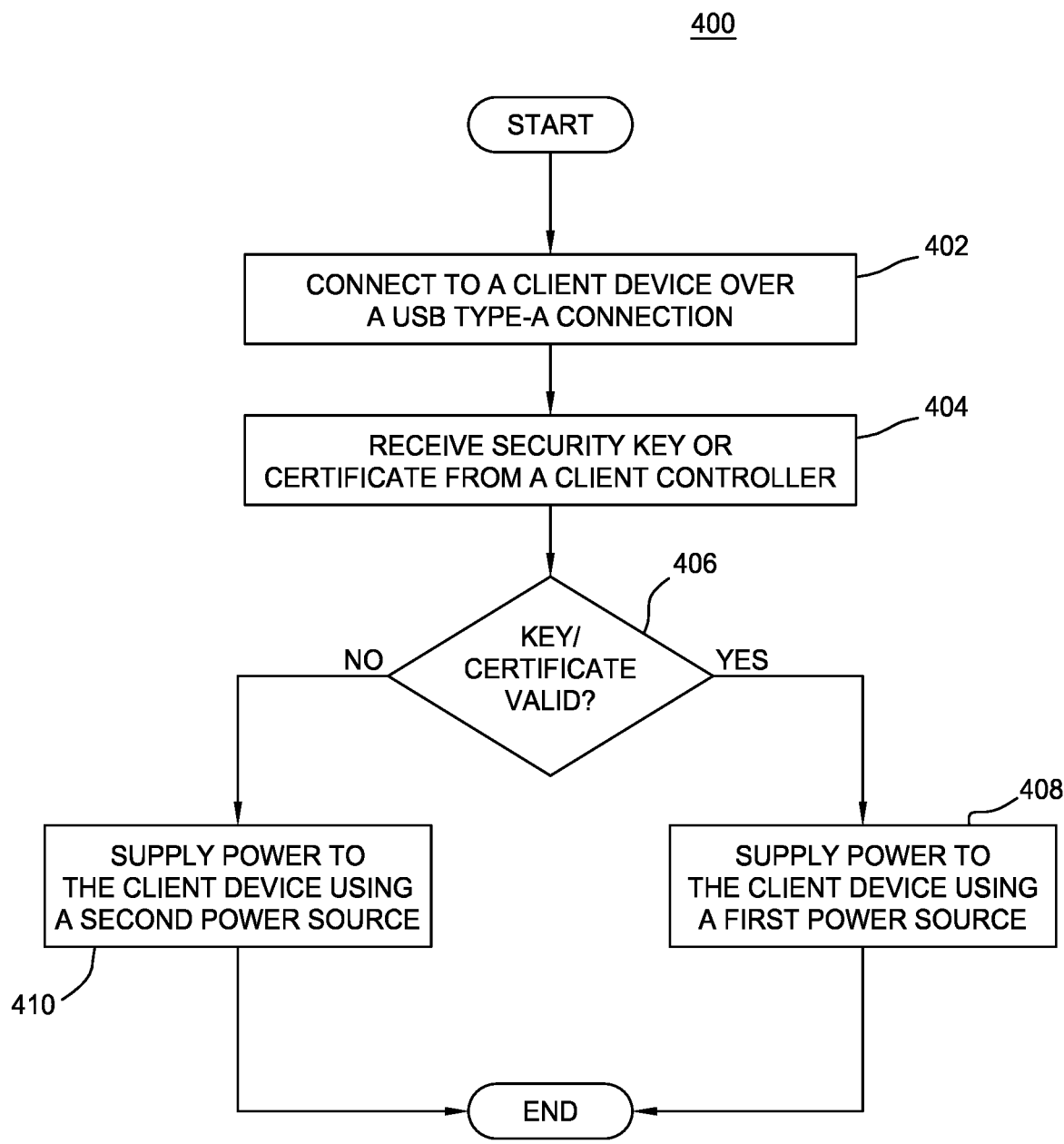
FIG. 4 is a flowchart of an example method in the system of FIG. 1.

FIG. 4 is a flowchart of an example method 400 in the system 100 of FIG. 1. The host controller 108 performs the method 400. In particular embodiments, by performing the method 400, the host controller 108 supplies sufficient electric power to a connected client device 104.

In block 402, the host controller 108 connects to a client device 104 over a USB Type-A connection. For example, a USB cable 202 may engage with a USB Type-A port 106 at a host device 102 and a USB Type-A port 118 at the client device 104 to form the USB Type-A connection. In block 404, the host controller 108 receives a security key or a certificate 128 from a client controller 120 in the client device 104. The host controller receives the security key or certificate 128 over the USB Type-A connection.

In block 406, the host controller 108 determines whether the security key or certificate 128 is valid. If the security key or a certificate 128 is valid, then the host controller 108 determines that the client device 104 should be supplied with additional electric power. In response, the host controller 108 supplies power to the client device 104 using a first power source 116 (e.g., a 12-volt power source) in block 408. If the host controller 108 determines that the security key or certificate 128 is invalid then the host controller 108 may determine that the client device 104 should be supplied with less electric power. In response, the host controller 108 supplies power to the client device 104 over a second power source 114 (e.g., a 5-volt source) in block 410. In this manner, the host device 102 supplies sufficient electric power to the client device 104, in particular embodiments.

Figure 5:
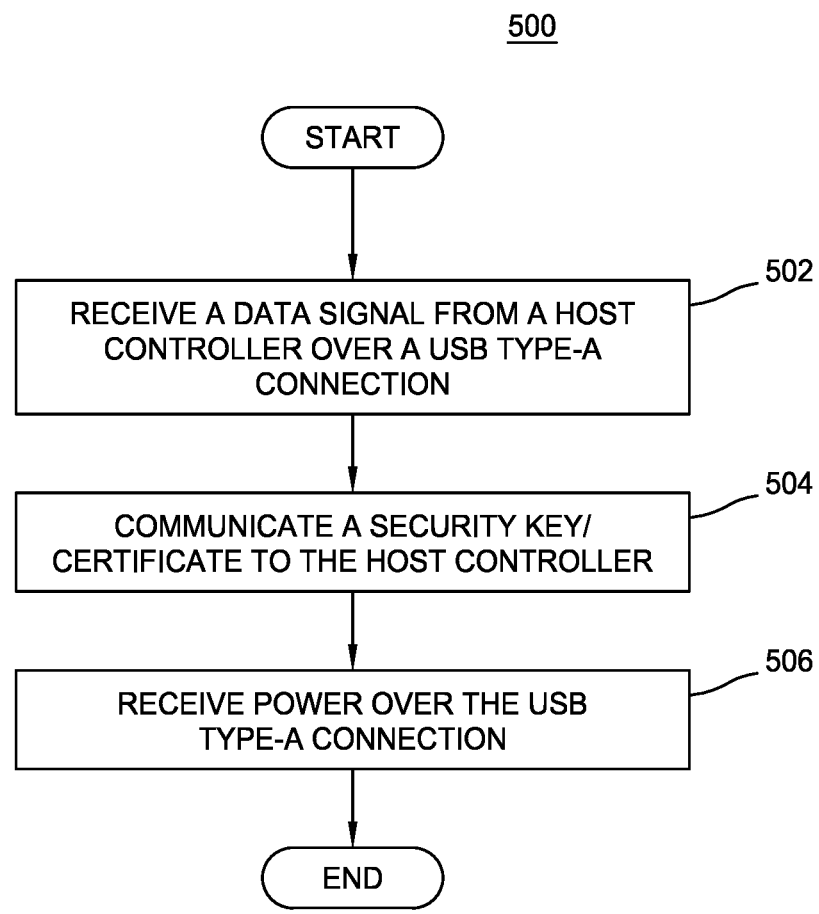
FIG. 5 is a flowchart of an example method in the system of FIG. 1.

FIG. 5 is a flowchart of an example method in the system 100 of FIG. 1. The client device 104 performs the method 500. In particular embodiments, by performing the method 500, the client device 104 receives sufficient electrical power.

In block 502, the client device 104 receives a data signal from a host controller 108 over a USB Type-A connection. The data signal may include a request to identify a client controller 120 in the client device 104. The USB Type-A connection may be formed by engaging a USB cable 202 to a USB Type-A port 106 at a host device 102 and a USB Type-A port 118 at the client device 104. In block 504, the client device 104 communicates a security key or certificate 128 to the host controller 108 over the USB Type-A connection. The client device 104 may communicate the security key or certificate 128 in response to the data signal. In block 506, the client device 104 receives power over the USB Type-A connection. The amount of power received over the USB Type-A connection depends on whether the security key or certificate 128 is valid or invalid. If the security key or certificate 128 is valid, the client device 104 receives additional electric power (e.g., power over a 12-volt source) over the USB Type-A connection. If the security key or certificate 128 is invalid, the client device 104 receives lower electric power (e.g., power over a 5-volt source) over the USB Type-A connection.

In summary, a host controller 108 determines how much power to supply to a client device 104 over a USB Type-A connection depending on whether the client device 104 includes a particular client controller 120. Two wires in the interface (e.g., a USB Receive wire and a USB Transmit wire of a USB 3.0 interface on a Type-A connector) are used to communicate clock and data signals to and from the host controller 108. The host controller 108 determines whether to use a low power source or a high power source by detecting the presence of the client controller 120 (e.g., client I2C controller) in the connected client device 104. For example, if the host controller 108 detects the client controller 120, the host controller 108 supplies power over a 12-volt source. Otherwise, the host controller 108 supplies power over a 5-volt source. Two wires (e.g., a USB Receive wire and a USB Transmit wire) are used to communicate clock and data signals to and from the client controller 120. The host controller 108 may detect the presence of the client controller 120 through identifiers or security keys or certificates 128 communicated by the client controller 120 to the host controller 108. In this manner, the USB Type-A interface may supply additional power (e.g., 20 W to 25 W of power) when needed.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving, at a host device and over a first universal serial bus (USB) Type-A connection, an identification message from a first filter;
   detecting, by a hardware processor of the host device and based on the identification message, that a client controller is present in the first filter;
   in response to detecting that the client controller is present in the first filter, supplying power from the host device to the first filter over the first USB Type-A connection using a first power source of the host device rather than a second power source of the host device physically different from the first power source;
   detecting, by the hardware processor of the host device and over a second USB Type-A connection, that a second filter lacks the client controller; and
   in response to detecting that the second filter lacks the client controller, supplying power from the host device to the second filter over the second USB Type-A connection using the second power source rather than the first power source.

2. The method of claim 1, wherein the first power source is a twelve volt source and the second power source is a five volt source.

3. The method of claim 1, wherein the hardware processor is connected to a USB Type-A port that facilitates the first USB Type-A connection by a first wire and a second wire of the USB Type-A port.

4. The method of claim 3, wherein the first wire is a transmit wire of the USB Type-A port and the second wire is a receive wire of the USB Type-A port.

5. The method of claim 3, wherein the hardware processor receives a clock signal over the first wire and a data signal over the second wire.

6. The method of claim 1, wherein detecting that the client controller is present in the first filter is further based on a security key or a security certificate received from the client controller.

7. An apparatus comprising:
a memory; and
a hardware processor communicatively coupled to the memory, the hardware processor configured to:
receive, over a first USB Type-A connection, an identification message from a first filter;
detect, based on the identification message, that a client controller is present in the first filter; and
in response to detecting that the client controller is present in the first filter, supply power to the first filter over the first USB Type-A connection using a first power source rather than a second power source physically different from the first power source;
detect, over a second USB Type-A connection, that a second filter lacks the client controller; and
in response to detecting that the second filter lacks the client controller, supply power to the second filter over the second USB Type-A connection using the second power source rather than the first power source.

8. The apparatus of claim 7, wherein the first power source is a twelve volt source and the second power source is a five volt source.

9. The apparatus of claim 7, wherein the hardware processor is connected to a USB Type-A port that facilitates the first USB Type-A connection by a first wire and a second wire of the USB Type-A port.

10. The apparatus of claim 9, wherein the first wire is a transmit wire of the USB Type-A port and the second wire is a receive wire of the USB Type-A port.

11. The apparatus of claim 9, the hardware processor is further configured to receive a clock signal over the first wire and a data signal over the second wire.

12. The apparatus of claim 7, wherein detecting that the client controller is present in the first filter is further based on a security key or a security certificate received from the client controller.

13. A method comprising:
receiving, by a first filter and over a first USB Type-A connection, a data signal from a host controller;
communicating, by the first filter and over the first USB Type-A connection a security key or a security certificate to the host controller in response to the data signal; and
receiving power over the first USB Type-A connection from the host controller, wherein the power is supplied using a first power source rather than a second power source physically different from the first power source in response to the security key or the security certificate being valid, wherein power is supplied to a second filter over a second USB Type-A connection using the second power source rather than first power source in response to detecting that the second filter lacks a client controller.

14. The method of claim 13, wherein the first power source is a twelve volt source and the second power source is a five volt source.

15. The method of claim 13, wherein the first filter is connected to a USB Type-A port that facilitates the first USB Type-A connection by a first wire and a second wire of the USB Type-A port.

16. The method of claim 15, wherein the first wire is a transmit wire of the USB Type-A port and the second wire is a receive wire of the USB Type-A port.

* * * * *